US005558920A

United States Patent [19]
Heide

[11] Patent Number: 5,558,920
[45] Date of Patent: Sep. 24, 1996

[54] LIGHTWEIGHT HONEYCOMB TABLETOP

[75] Inventor: Ulf B. Heide, Marblehead, Mass.

[73] Assignee: Technical Manufacturing Corporation, Peabody, Mass.

[21] Appl. No.: 206,954

[22] Filed: Mar. 7, 1994

[51] Int. Cl.[6] .................... B32B 3/12
[52] U.S. Cl. .................... 428/116; 248/637; 428/131; 428/138
[58] Field of Search .................... 248/637; 428/116, 428/131, 138

[56] References Cited

U.S. PATENT DOCUMENTS

| | | | |
|---|---|---|---|
| 3,104,194 | 9/1963 | Zahorski | 428/116 |
| 3,137,604 | 6/1964 | Bosch | 428/116 X |
| 3,176,662 | 4/1965 | Williams | 211/60.1 X |
| 3,456,806 | 7/1969 | Borston | 211/69.5 X |
| 3,601,343 | 8/1971 | Sivaslian | 248/637 |
| 3,831,019 | 8/1974 | Halfaker | 52/28 X |
| 3,836,416 | 9/1974 | Ropiequet | 428/294 |
| 4,221,014 | 9/1980 | Davidson | 114/343 |
| 4,241,892 | 12/1980 | Morris | 428/116 X |
| 4,360,184 | 11/1982 | Reid | 248/573 |
| 4,370,372 | 1/1983 | Higgins et al. | 428/116 |
| 4,606,156 | 8/1986 | Sweers | 52/126.6 |
| 4,621,006 | 11/1986 | Terry et al. | 428/116 |
| 4,645,171 | 2/1987 | Heide | 428/116 X |
| 4,666,748 | 5/1987 | Rinkewich | 428/12 |
| 5,154,963 | 10/1992 | Terry | 248/637 X |
| 5,402,734 | 4/1995 | Galpin et al. | 428/116 X |

FOREIGN PATENT DOCUMENTS

| | | | |
|---|---|---|---|
| 8124598 | 7/1983 | France . | |
| PS836401 | 4/1952 | Germany | 428/131 |
| 57-136238 | 8/1982 | Japan . | |
| 60-39633 | 3/1985 | Japan . | |
| 1270309 | 4/1972 | United Kingdom . | |

OTHER PUBLICATIONS

Modern Machine Shop, Emphasis: Pressworking and Metal Forming, By Nils Sundquist, President, Mate Punch and Die Company, pp. 1–10.

Photon Control Limited Catalog, Optical Tables and Vibration Isolation Systems, Mid 1985.

*Primary Examiner*—Henry F. Epstein
*Attorney, Agent, or Firm*—Samuels, Gauthier, Stevens & Reppert

[57] ABSTRACT

A honeycomb tabletop where the upper skin has tapped holes formed therein. The tapped holes have a thickened portion at the a top surface of the skin and the tapped holes are characterized by depending extension formed integrally with the tapped holes. Threads are formed on the inner surface of the tapped hole including the sleeve. The depending sleeve effectively increases the number of threads to secure a fastener.

8 Claims, 1 Drawing Sheet

LIGHTWEIGHT HONEYCOMB TABLETOP

BACKGROUND AND BRIEF SUMMARY OF THE INVENTION

The invention relates generally to laboratory tables and more particularly to honeycomb tabletops for use in supporting precision laboratory equipment.

Vibration isolation tables used for supporting highly sensitive equipment, such as optical or analytical devices, on a substantially vibration-free surface are well known. Such systems generally include a tabletop comprising metallic upper and lower skins bonded to a honeycomb core and a connecting side wall. The upper skin of the tabletop usually contains a plurality of holes (usually drilled and tapped) which are used for securing equipment on the tabletop surface. A honeycomb core with or without additional stiffening or damping components maintains a rigid separation between the skins and therefore the structural integrity of the top. These tabletops are commonly referred to as honeycomb tabletops and in most instances are supported by a vibration isolation system.

U.S. Pat. No. 4,645,171 is believed to represent the closest prior art to the invention disclosed herein. The '171 patent teaches that cups are secured to the underside of the top skin in registration with the tapped holes. The cups are non-load bearing in that a fastener may be secured in the threaded hole, which is in registration with the cup, without any force or torque being applied to the cup. The tabletops (breadboards) disclosed in that patent are generally referred to in the industry as Clean Top™ tabletops. When a spill occurs or the tabletop is otherwise contaminated, the tabletop can be cleaned on site simply by washing with solvents and then rinsing, including aspirating the cups. The cups prevent contamination of the inside of the tabletop.

The present invention is directed to an improvement of the tabletop disclosed in the '171 patent. In prior art constructions, the holes in the top skin are usually tapped and in those constructions the number of threads is limited by the thickness of the upper skin. This is generally suitable for larger breadboards where the thickness may typically range from 0.125 to 0.187 inches. In lightweight breadboards, the thickness of the upper skin is typically 0.074 inches. For these breadboards where the threads are coextensive with the thickness of the upper skin, it is often times difficult to properly secure instruments to such a thin upper skin.

It is essential with breadboards that all movement of the instruments secured thereto, as far as possible, be eliminated. Ordinarily, with the larger breadboards having the thicker upper skin, the thickness of the skin and the number of threads in the skin are sufficient to ensure easily that the instruments secured to the breadboard remain immobile. However, with the lightweight breadboards having the thin upper skin, the threaded fasteners which secure the instruments to the breadboard do not always ensure that the devices will remain immobile.

Threaded fasteners in a tapped hole will frequently loosen or fail due to the metal fatigue of the fastener or stripping of the threads in the hole. Most often the failure of the fastener will occur at the threads which are at the end of the tapped hole closest to the application of the load, i.e. the top surface of the skin. When the load is transferred from a threaded fastener to the threads in a tapped hole in the usual way (threaded fastener in tension, tapped hole in compression) the transfer occurs in a nonuniform manner along the thread engagement between the threaded fastener and the tapped hole. The load transfer will be maximum at the first engaged thread and the direction of the load will decrease, but not linearly, to a minimum at the last engaged thread. With the thin upper skin and depending upon the instrument secured thereto, there is sometimes not enough thickness and/or number of threads to properly secure the fastener.

In the present invention, tapped holes in an upper skin of a lightweight breadboard are formed to both thicken the skin in that portion of the tapped hole closest to the applied load and to form a sleeve depending from the lower surface of the upper skin. This latter feature allows for more threads to be formed in the hole to secure an instrument to the top skin. Further, the holes as formed enhance the strength and integrity of the top skin.

Plastic or metal cups are glued into position after the top skin has been fully manufactured. The shape of the extruded hole keeps the adhesive out of the threads.

DESCRIPTION OF THE PREFERRED EMBODIMENT(S)

A breadboard is shown generally at 10 and comprises a top skin 12 having tapped holes 14. The upper skin is spaced apart in parallel relationship from a bottom skin 16 and secured thereto by side walls 18.

Figure 1:
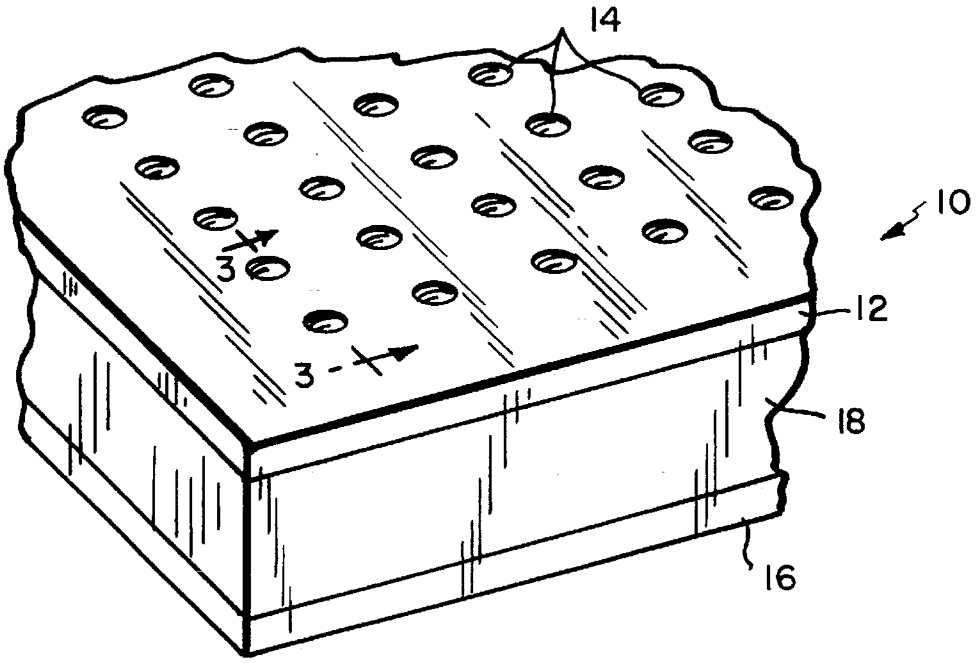
FIG. 1 is a fragmentary perspective view of a breadboard embodying the invention.
Figure 2:
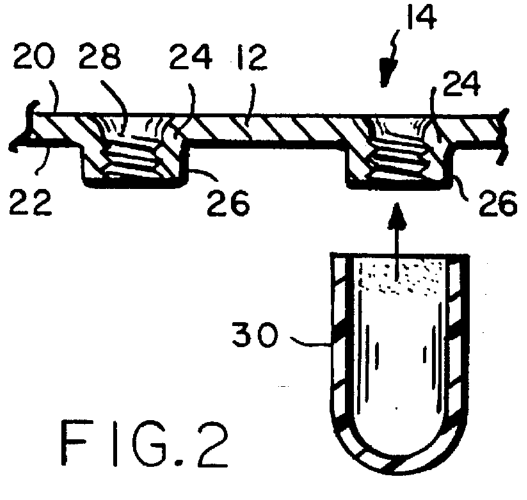
FIG. 2 is a side sectional fragmentary view of an upper skin prior to the attachment of a cap.

Referring to FIG. 2, the top skin 12 and the tapped holes 14 are shown in greater detail. The top skin comprises an upper surface 20 and a lower surface 22. The tapped holes 14 comprise an arcuate, thickened portion 24 and a depending sleeve 26 which extends downwardly from the upper skin 12. The holes 14 are tapped to form threads 28 which extend from the top surface 20 of the skin 12 to the bottom of the depending sleeve 26.

Figure 3:
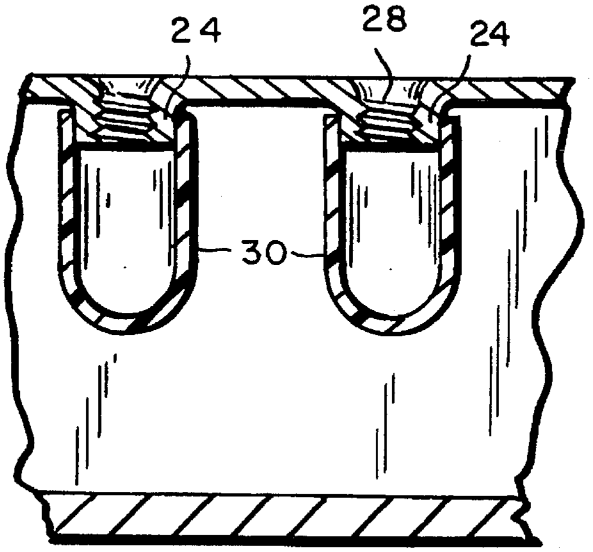
FIG. 3 is a sectional view of FIG. 1 taken along lines 3—3.

The formation of the holes, the extrusion of the sleeve and the formation of the threads are achieved by prior art techniques. After the holes have been formed and tapped along their entire length, the holes are sealed, by attaching cups 30 to the outer surface of the sleeve 26. As shown in FIG. 2, the adhesive preferably is first applied to the inner top surface of the sleeve and then the cup secured to the sleeve as shown in FIG. 3. Alternatively, the adhesive can be applied to the outer surface of the sleeve 26 and the cup engaged to the sleeve or adhesives may be applied to both the outer surface of the sleeve 26 and the inner surface of the cup 30.

With the breadboard of the present invention, the thickness of the upper skin is effectively thickened where the greatest pressure applied by the threaded fastener occurs. This enhances the ability of the upper skin to absorb the forces and rigidly secure an instrument to the breadboard. Additionally, the number of threads is increased at least by a factor of two over the number of threads that could be formed into a comparable prior art upper skin of the same thickness. The totality of the thickened holes effectively increases the strength and integrity of the top skin. Lastly, the shape of the extruded hole keeps the adhesive out of threads.

In a preferred embodiment, all the holes of an upper skin of a breadboard would be extruded and tapped in a similar manner and cups would be secured to the underside of the top skin in registration with each of the holes. However, it is within the scope of the invention that only some of the holes may be so extruded and tapped. Further, the holes can be extruded and tapped in either a uniform or random pattern within the upper skin.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. In a breadboard having upper and lower skins rigidly secured in parallel relationship to the top and bottom surfaces of an outer wall, the improvement which comprises:

a plurality of extruded tapped holes formed in the upper skin, at least some of said holes characterized by an arcuate section of increased thickness formed in the skin and a sleeve formed integrally with and depending from the arcuate section of increased thickness, the holes characterized by threads extending downwardly from the arcuate section of increased thickness into the inner surface of the sleeve.

2. The breadboard of claim 1 wherein the threads extend along the entire length of the sleeve.

3. The breadboard of claim 1 wherein the tapped holes are formed in the upper skin in a grid-like pattern.

4. The breadboard of claim 1 wherein all of the holes formed in the upper skin surface are characterized by a section of increased thickness and a depending sleeve.

5. The breadboard of claim 1 wherein non-load bearing cups are secured to the lower surface of the upper skin in registration with at least some of the holes.

6. The breadboard of claim 5 wherein all of the holes have cups in registration therewith.

7. The breadboard of claim 6 wherein the cups are adhesively secured to the outer surfaces of the sleeves.

8. The breadboard of claim 6 wherein the tapped holes enhance strength and integrity to the top skin.

* * * * *